May 28, 1963   C. W. STRZALKOWSKI   3,091,020
EYEGLASS HEARING AID AND METHOD OF MANUFACTURE
Filed July 30, 1957   5 Sheets-Sheet 1
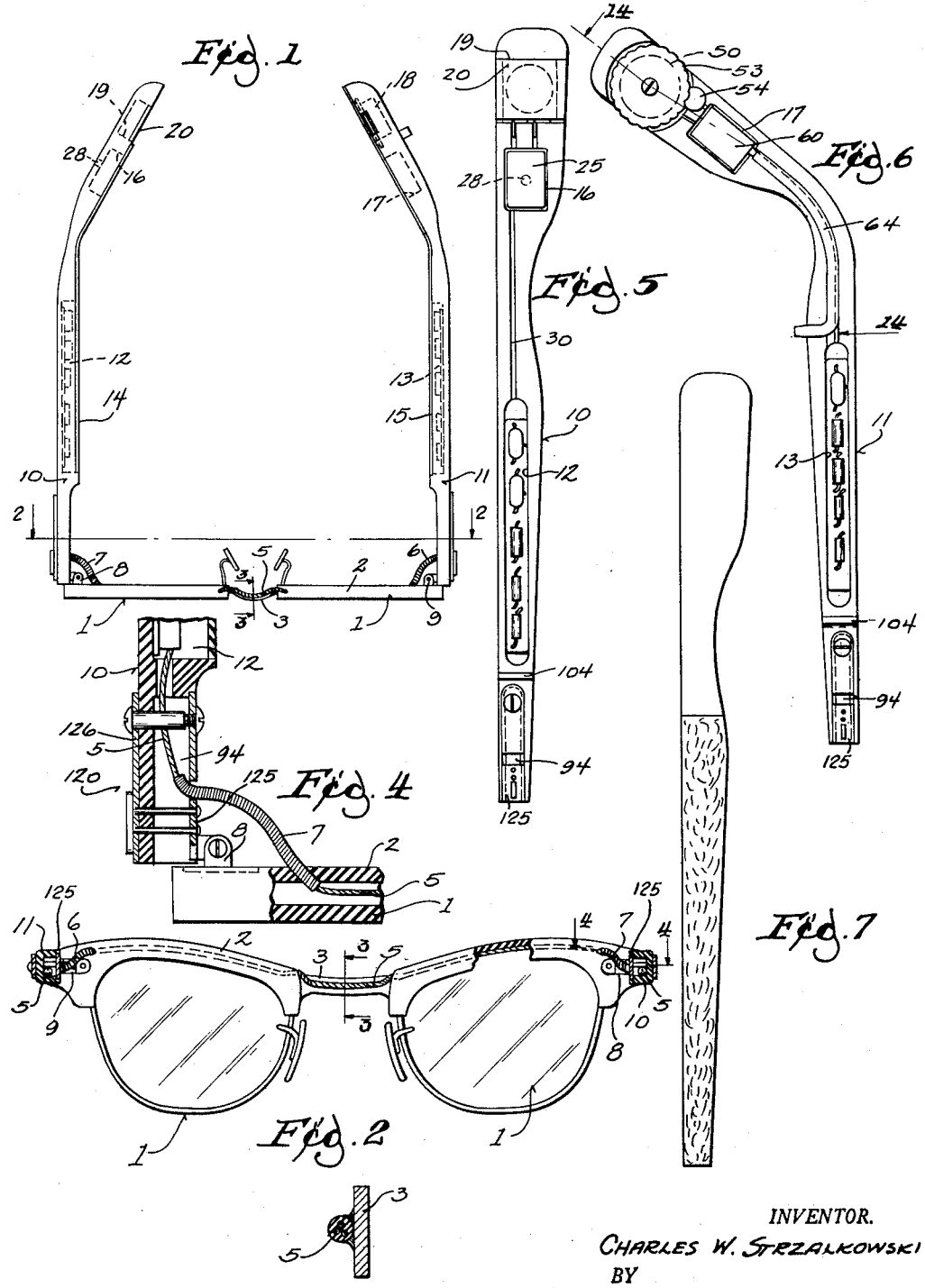
INVENTOR.
CHARLES W. STRZALKOWSKI
BY
Wheeler, Wheeler & Wheeler
ATTORNEYS

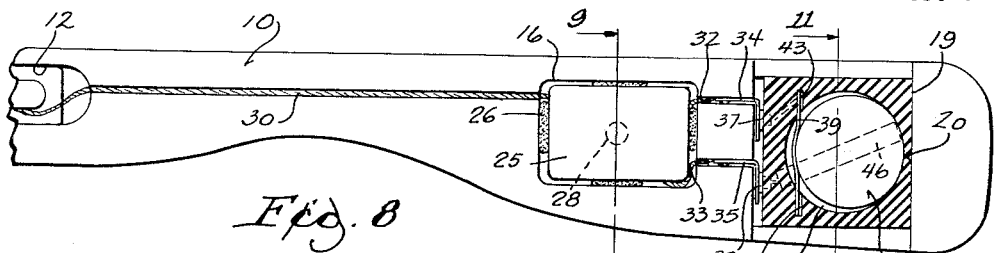

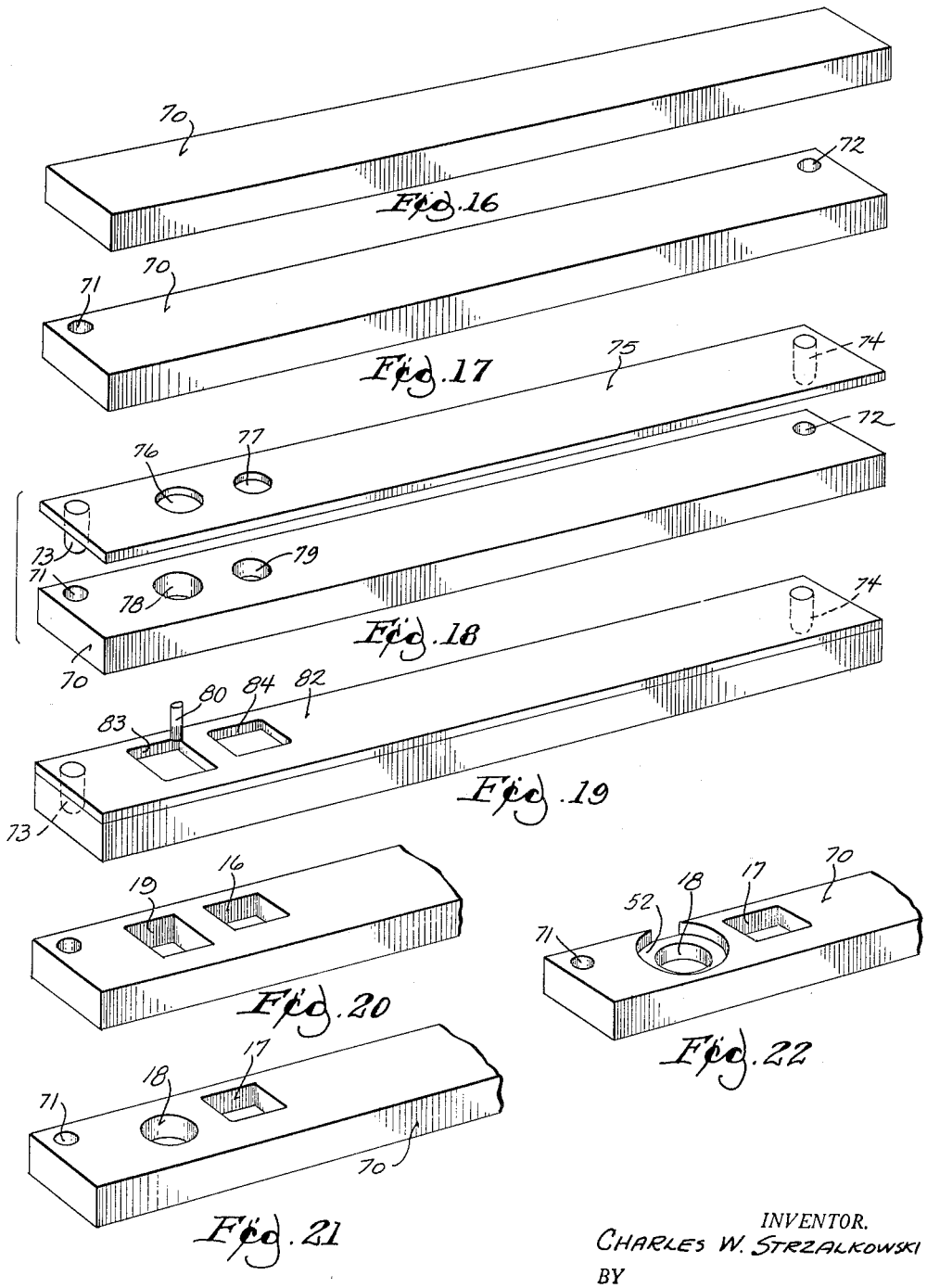

May 28, 1963 C. W. STRZALKOWSKI 3,091,020
EYEGLASS HEARING AID AND METHOD OF MANUFACTURE
Filed July 30, 1957 5 Sheets-Sheet 4

INVENTOR.
CHARLES W. STRZALKOWSKI
BY
Wheeler, Wheeler & Wheeler
ATTORNEYS

INVENTOR.
CHARLES W. STRZALKOWSKI
BY
Wheeler, Wheeler & Wheeler
ATTORNEYS

United States Patent Office 3,091,020
Patented May 28, 1963

3,091,020
EYEGLASS HEARING AID AND METHOD
OF MANUFACTURE
Charles W. Strzalkowski, 824 N. 27th St., Milwaukee, Wis.
Filed July 30, 1957, Ser. No. 675,161
3 Claims. (Cl. 29—20)

This invention relates to a hearing aid device incorporated in a spectacle frame and a method of manufacture thereof.

The present application is a companion to my application Serial No. 501,473 filed April 15, 1955, now Patent No. 3,035,127 issued May 15, 1962. In general, the effort in this field has been to provide eyeglass temples which can be molded in quantities to receive electronic components of a hearing aid amplifier. However, both because of the need for adapting these components to the requirements of a particular wearer and also because of rapid development in the electronic industry, I have found it very desirable to provide a construction and method for economically producing the temples singly or in smaller groups through the use of templates which can be changed almost at will to produce any desired modification.

In the preferred embodiments herein illustrated, the eyeglass temples are machined from bar stock initially of sufficient length to provide sockets that receive a succession of templates for the machining operations, whereby the exterior surfaces of the work are carved to a desired contour, and cavities and contacting channels are machined within the bar to receive the electrical components. The arrangement permits the recesses for the electrical components to be alternated at will as between the right and the left temples according to the position desired for the receiver or speaker which reproduces the sound for transmission to the wearer's ear.

In the finished product, the receiver is socketed in one of the temples and is desirably fastened therein solely by wedging a piece of sponge rubber or the like between the receiver or the wall of the cavity and covering the receiver, along with the other electrical components, by a cover plate screwed and/or cemented to the temple proper, the sound being delivered through a tube for which a channel is cut into the temple.

In similar fashion, the microphone is mounted in the opposite temple of the eyeglasses and similarly wedged in the cavity provided for it and covered by a cover plate, the temple being bored with a minute orifice opening outwardly to receive the sound to be picked up by the microphone and amplified by the electronic amplifier.

Another feature of the invention, mechanically, is the provision of a novel volume control arrangement desirably located at the rear end of one of the temples to lie behind the wearer's ear, the volume control comprising an adjusting dial which projects marginally from the temple at one side thereof, all of the portions of the periphery of the dial being within the outline of the temple.

The battery is desirably mounted in a miniature box set into a rectangular pocket in one of the temples and wedged therein in the same manner above described and covered by the closure plate which provides a liner for the inner surface of the temple.

A multiple wire connector is housed within those portions of the spectacle frame which span the eyeglasses, the connector having flexible portions bridging the hinged joint between the eyeglass frame and the respective temples.

In the drawings:

FIG. 1 is a plan view of a hearing aid incorporated in a spectacle frame in accordance with the present invention.

FIG. 2 is a view taken in section on line 2—2 of FIG. 1.

FIG. 3 is a view taken in section on line 3—3 of FIG. 1.

FIG. 4 is an enlarged detail view taken in section on the line 4—4 of FIG. 2.

FIG. 5 and FIG. 6 are views in elevation of the inner faces of the respective temples as they appear with their respective cover plates removed.

FIG. 7 is a view in side elevation of the exterior face of one of the temples optionally provided with a decorative strip laminated to it.

FIG. 8 is a greatly enlarged fragmentary view of the rear end portion of the temple shown in FIG. 5, portions of the battery case being shown in section to expose the battery therein.

FIG. 9 is a detail view taken in section on the line 9—9 of FIG. 8.

FIG. 10 is a fragmentary detail view in perspective separately illustrating one of the wire contacts for completing the battery circuit.

FIG. 11 is a view taken in section on line 11—11 of FIG. 8.

FIG. 12 is a view of the battery box in perspective.

FIG. 13 is a view showing in mutually separated positions the inverted battery box and the battery mounted therein.

FIG. 14 is a view on an enlarged scale taken in section on line 14—14 of FIG. 6.

FIG. 15 is a fragmentary detail view similar to a portion of FIG. 6 showing a modified embodiment of the invention especially designed for use by a patient who has had an auriculostomy, portions of the temple being broken away to expose the tube which delivers sound from the reproducer.

FIG. 16 is a view in perspective of a starting blank for the manufacture of a temple.

FIG. 17 shows the blank equipped with locating holes as a first step in the method.

FIG. 18 is a view showing in perspective a separated blank and a template provided with dowel pins registering with the locating holes and having apertures through which corresponding openings have been made in the blank.

FIG. 19 is a view showing in perspective a substitute template applied to the blank of FIG. 12 and having holes of different shape with which a router is shown associated for making holes of corresponding shape in the blank.

FIG. 20 is a fragmentary detail view in perspective showing the end of a blank in which holes have been made according to FIG. 19.

FIG. 21 shows fragmentarily an alternative type of hole provided in the blank in the event that a different template is used in order to permit the microphone and reproducer to be reversed in the respective temples.

FIG. 22 is a fragmentary detail view in perspective showing the result of a successive counterboring operation upon the blank of FIG. 21.

Figure 23:
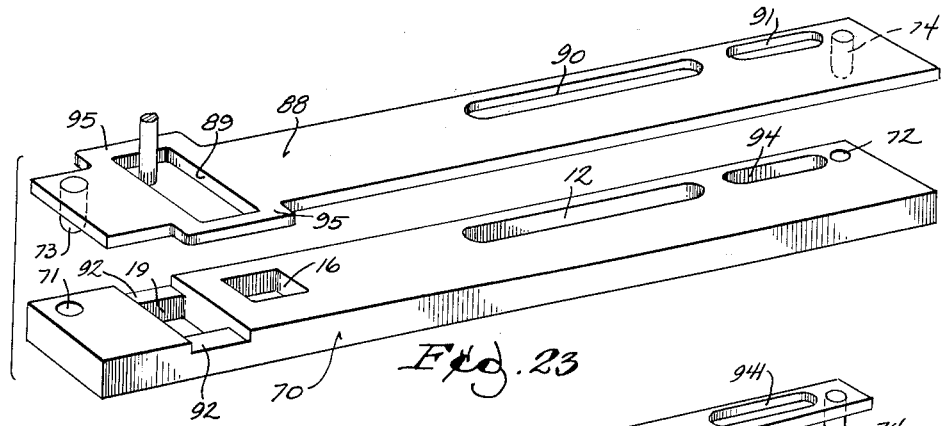
FIG. 23 is a view in perspective showing in relatively separated positions a template for a routing operation upon the blank of FIG. 20 and showing the result of such operation upon the blank.

A spectacle frame incorporating a hearing aid in accordance with the present invention may comprise eyeglasses 1 mounted in any desired form of complete or sectional rims 2 which are interconnected by a bridge 3 in any appropriate manner. In the device illustrated, the rims 2 are sectional, extending only across the upper surfaces of the lenses 1. Embedded in the rims and cemented to the rear of the bridge 3 is a multiple wire cable 5 as shown in FIGS. 2 and 3. This cable is exposed at 6 and 7 and is flexible to span the hinged connections 8 and 9 between the eyeglass frame 2 and the respective temples 10, 11.

The present invention is not concerned with the electronic amplifier, which may be made up of the usual transistors, capacitors and resistors, these desirably being of such small size as to be receivable into cavities provided at 12 and 13 in the temples 10 and 11 respectively. The multi-wire cable 5 provides operable electrical connection between those portions of the amplifier which are in temple 10 and those which are in temple 11. The cavities 12 and 13, and other cavities in the temples hereinafter to be described, are closed by cover plates 14, 15 which extend along the inner faces of the respective temples as clearly shown in FIG. 1. The cover plate 14 terminates short of the rear end of temple 10 after extending across the microphone cavity 16. The cover plate 15 may extend clear to the rear end of temple 11 after passing across the receiver cavity 17 and the volume control cavity 18. The battery cavity 19 in temple 10 lies behind the end of closure plate 14 having its own mounting box 20 (FIGS. 8, 11, 12, and 13) for convenience in battery replacement.

As already indicated in the opening paragraphs of this specification, the location of the reproducer (also known as a receiver or speaker) may be in either temple to lie proximate to the ear into which the sound is to be conveyed through the usual tube. The microphone will be put in the other temple. Accordingly, the device as shown is designed to deliver sound into the left ear of the wearer and to pick up the sound from a microphone in the right temple 10. If the sound were to be delivered to the wearer's right ear, the receiver and the volume control would be interchanged with the microphone and battery in the respective temples.

FIG. 8 shows an enlarged detail view of the temple in which the microphone and battery are mounted which, in this instance, is temple 10. The microphone cavity 16 has the microphone 25 wedged into it by means of small wedges 26 of sponge rubber or the like, the cavity then being covered by the plate 14 as shown in FIG. 1. In the outer portion of the temple in which the microphone is located, there is a minute orifice 28 through which sound is admitted to the microphone cavity 16 to be picked up by the microphone 25 therein. An electrical cable 29 is housed within a slot 30 formed within the temple beneath the cover plate 14 to provide communication between the microphone cavity 16 and the amplifier cavity 12. Electricity for the microphone and the electronic amplifier is provided by the conductors 32, 33 connected to spring terminal contacts 34, 35 as shown in FIGS. 8 and 10.

The battery box 20 has terminals 37, 38 positioned to engage the spring contacts 34, 35. Terminal 37 is connected with a resiliently flexible contact strip 39 which has its ends disposed in slots in the battery box 20 to extend across a minor chord of socket 40 in which the battery 42 is detachably housed. The slots or pockets 43, 44 for the ends of the spring contact strip 39 are clearly illustrated in FIG. 13. They hold the strip in a position to engage the side wall of the metal shell which forms one of the contacts of the battery 42 in a conventional manner. The central contact 45 of the battery engages a contact spring 46 positioned in the bottom of the battery cavity 40 of box 20, spring 46 being connected to terminal 38. The battery box is in the form of a dielectric block of rubber or plastic shaped to fit into the socket 19 provided by the temple. The box has lateral flanges 48 and 49 for resting on the surfaces provided by the temple as best shown in FIG. 11.

In the opposite temple (either 10 or 11, as the case may be) the volume control 50 is mounted in the cavity 18 by wedges 51 of sponge rubber or the like. A counterbored enlargement of the cavity at 52 receives the adjusting dial or disc 53 which is of sufficient diameter so that at least one of its margins projects beyond the cover plate to be accessible to the user for rotation. Desirably I provide a miniature switch at 54 with an exposed handle 55 projecting outwardly through an orifice 56 in the temple where it can be manipulated to open and close the circuit.

The reproducer 60 is mounted in its cavity 17 by its own wedges 61 of spong rubber or the like. The channel 63 extending from the receiver cavity 17 to the amplifier cavity 13 beneath cover plate 15 may house a sound conducting tube 64 of natural or synthetic rubber or resin which leads to the usual ear plug. The channel 63 further houses the necessary cable 65 providing electrical connection between the volume control, the switch, the receiver and the amplifier section which is in cavity 13.

FIG. 15 shows a modification in which the channel at 63 houses only the tube 65 for the wiring, the reproducer 600 being so designed as to deliver its sound through a flexible connecting tube 67 to a metal tube 68 fixed in the temple. Sleeved onto tube 68 is a tube 69 which leads through the auricular hole in the patient's ear to the ear plug in the manner described in the copending application above identified.

A preferred method of constructing the temples for the purposes of this application is shown in FIGS. 16 to 28 inclusive which will now be described.

In practice, I start with a blank 70 of synthetic resin of the type sold commercially under the trade name "Plexiglas." The blank I use is ⅜ x ¾ x 8 inches, but it will be understood that the examples given here and elsewhere in this specification are solely by way of example and not by way of limitation. Holes are provided at 71 and 72 in this blank to receive dowels 73 and 74 respectively, identical dowels being provided on each of a succession of templates used in the manufacturing operation.

The first of these templates is shown at 75 in FIG. 18. It is provided with apertures 76, 77 through which drills or end mills are inserted to bore the holes 78, 79 in the blank 70 as shown in FIG. 18. In practice, the hole 78 has a radius of .460 inch and is ¼ inch deep while the hole 79 is ⅜ inch in diameter and .210 inch deep. The object of providing these holes is to remove considerable material and to receive the router 80 shown in FIG. 19.

In the operation shown in FIG. 19, the template 75 has been removed and template 82 has been substituted. The template 82 has identical dowels at 73 and 74 for locating it with respect to the blank 70. It has generally rectangular openings at 83, 84 to receive the router 80 and to guide it in cutting in the blank the microphone and battery cavities 16 and 19 respectively. Parenthetically it may be remarked that if the temple is to receive the reproducer and volume control instead of the microphone and battery, the template used will guide the router to make cavities 17 and 18 in the blank as shown in FIG. 21 rather than the cavities 16 and 19 as shown in FIG. 20.

In that event, an end mill or some similar tool is used to provide the counterbore 52 for the cavity 18 as shown in FIGS. 14 and 22. As best shown in FIGS. 6 and 14, this counterbore receives the control disc 53 of the volume control 50.

Returning now to the procedure followed in the manufacture of that temple which is to receive the microphone and battery, reference is made to FIG. 23 of the drawings which shows the next template 88 which, when applied to the blank 70, guides the router inserted through the template openings 89, 90 and 91 to cut away the synthetic resin of the blank 70 to form the shoulders 92 and the communication slots 12 (or 13) and 94. Since the shoulders 92 extend to the side margins of the blank, the template 88 is enlarged at 95 so that the opening 89 through which the router is inserted, and the sides of which guide the router, can be equal in width to the overall width of blank 70 at this point.

Figure 24:
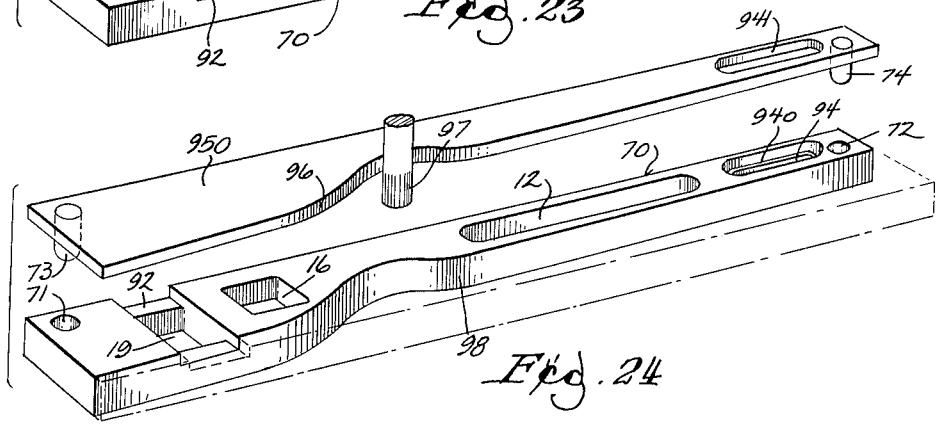
FIG. 24 is a view in perspective of relatively separate blank and template with an associate milling cutter for shaping a margin of the blank.

The next step is to contour the side margins of the blank 70 and provide a shoulder 940 around cavity 94. As shown in FIG. 24, template 950 has a contoured side margin 96 which guides the milling cutter or the like 97 as it cuts the edge 98 of the blank in conformity with the patterned shape of template 950. This operation is of such a character that number of blanks can be superimposed and concurrently contoured through the use of a single template if desired. The slot 941 in the template 950 guides the router or other tool which provides shoulder 940.

Figure 25:
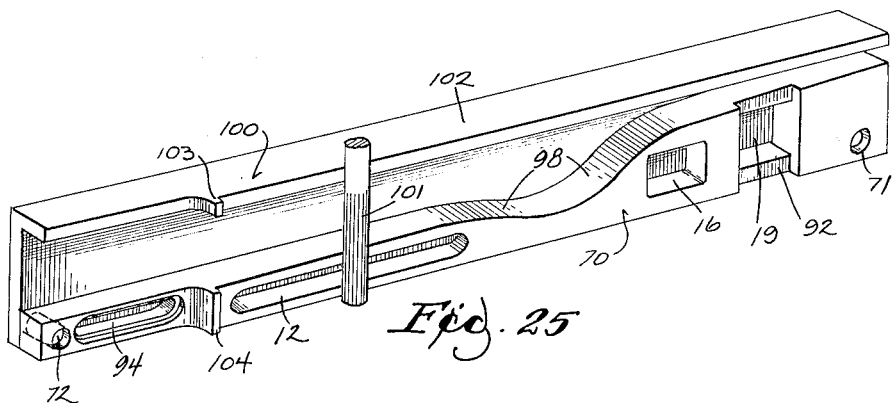
FIG. 25 is a similar view in perspective showing a different template associated with a blank and a milling cutter for shaping the inner face of the blank.

For the next operation, the blank 70 is turned on its edge as shown in FIG. 25 in order that one of its faces may be contoured. The template 100 has locating pins similar to those previously described, but the surface which guides the milling cutter 101 is the edge of a laterally projecting flange 102 with which the template is provided. An outstanding lug portion 103 of this surface forms a corresponding lug at 104, the arrangement being such that the hinge leaf is connected to the end of the blank which is nearest to the lug 104, while the cover plate 14 or 15, as the case may be, seats against a shoulder provided at the other side of the lug.

Figure 26:
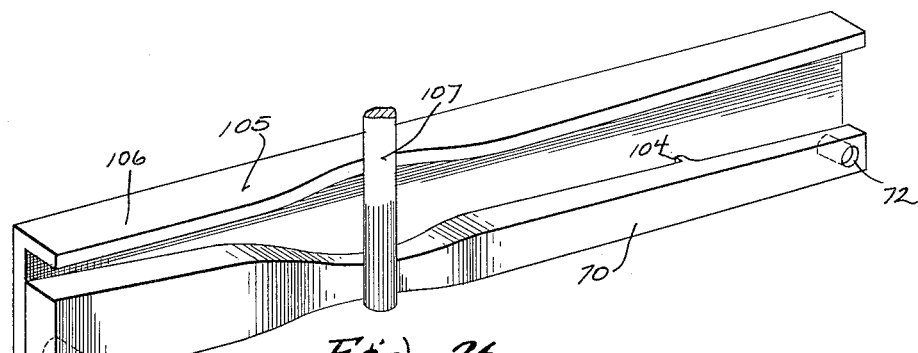
FIG. 26 is a view in perspective showing another template and milling cutter associated for producing a further shaping operation on the external face of the blank.

The template 105 shown in FIG. 26 has a flange 106 and is used in a manner similar to the manner in which template 100 is used, the contour of the flange being such, however, as to guide the milling cutter 107 in contouring the other or opposite face of the blank 70.

Figure 27:
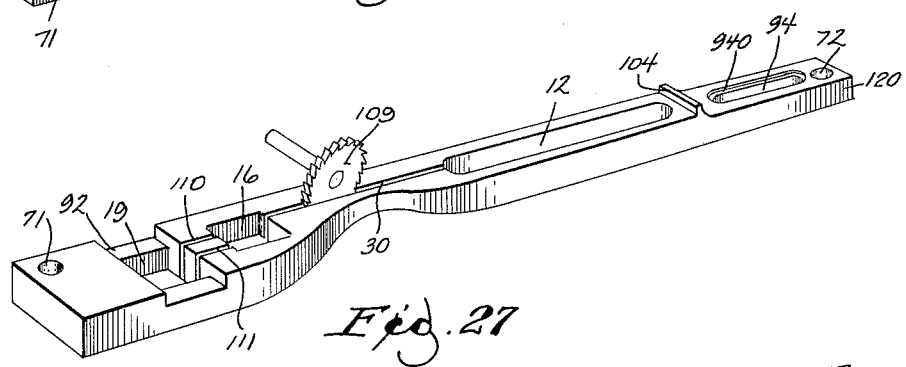
FIG. 27 is a view in perspective showing a saw cutting slots providing for communication between the various cavities of the blank.
Figure 28:
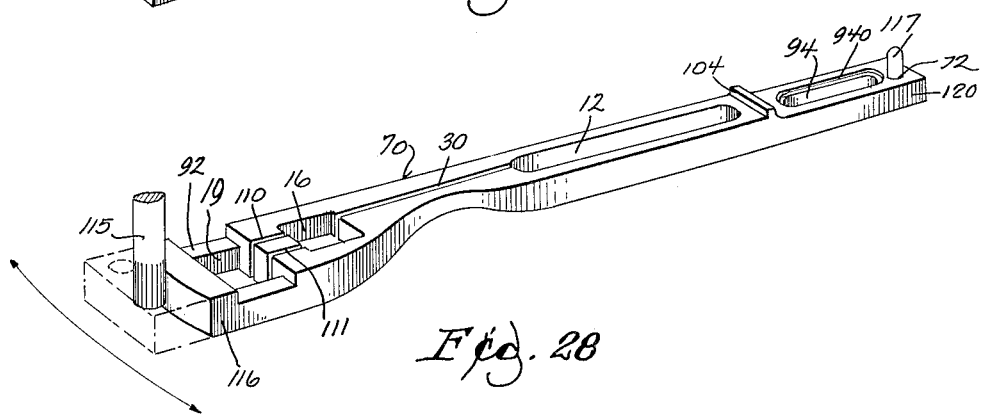
FIG. 28 is a view in perspective showing the step of cutting away one of the apertured ends of the blank and rounding such end.

In the operation shown in FIG. 27, a saw or disc type milling cutter 109 is being used to form slots 110, 111 and 30 providing communication between the various cavities so that the wiring may connect the components socketed in these cavities.

The end portions having the locating holes 71, 72 are now cut away. Since the end of the blank which provides cavity 19 (or the corresponding end which provides cavity 18) is considerably the wider end, it is preferred to remove this first and to use a cutter 115 operating in a relatively fixed position past which the end portion 116 of blank 70 is oscillated about a pin 117 upon which the locating hole 72 at the opposite end of the blank is pivoted.

Since the remaining operations are hand work, they are not separately illustrated. They include rounding the severed end in both planes; drilling any necessary holes such as those which receive the mounting bolts for the hinge leaves and the hole 28 which allows sound to enter the microphone cavity 16; heating the blank and bending it or shaping it to any desired form; and finishing its surface (which I do by means of two wet sand blast operations, and final buffing). The over-all length of the temple is determined by the point at which the smaller end 120 is severed, the holes for the hinge leaves being located accordingly. The temple is now complete and its electrical components can be installed and the temple attached to the spectacle frame.

In practice, the attachment of the cover plate 14 or 15 is the final operation, although it could be done earlier. Since permanence is desirable, I prefer to supplement the usual screws with cement as a means of attaching the plates over the electrical components which are to be covered thereby. As already noted, the plate 14 terminates short of the battery cavity 19, since the battery must be accessible for replacement and is conveniently housed in a box which comprises its own cover for the cavity.

It will be observed in FIGS. 1 and 2 that the hinge leaves such as that shown at 125 serve as covers for cavity 94 and are connected through the temple to an external reinforcing plate 126. It is conventional practice, and optional in the present case, to use such reinforcement to which the hinge leaf is connected through the temple.

While I have described with particularity the construction of the blank used in making the temple 10, it has also been indicated that, optionally, the electrical components can be reversed in the respective temples, this requiring only an interchange of templates and the successive templates being used serially in guiding the cutter in a manner corresponding to that described by way of exemplification.

Not only can the components be interchanged with ease, but this method of manufacture permits the construction of differing contours for the temples in accordance with the wearer's preference. As the shapes and sizes of the electrical components are altered in consequence of developments in this changing art, the sizes and shapes of the cavities provided for them can be changed on short notice simply by providing the requisite template. Thus, the experience in this art indicates that a succession of templates used to guide the performance of the different cutting operations has advantages over and above the more conventional mass production of parts in multiple cavity molds.

I claim:

1. A method of manufacturing an eyeglass temple to receive hearing aid components, which method comprises forming locating means in a blank, providing a series of templates having identical complementary locating means and respectively formed to guide cutting tools for performance of successive operations on the blank, sequentially applying the templates to the blank and cutting away portions of the blank guided by successive templates, the cutting including the removal of material from a number of different sides of the blank, different templates being used for each side, the complementary locating means on such template cooperating with the same locating means in the blank.

2. A method of manufacturing temples for mounting hearing aid components on spectacles, which method comprises the provision of locating holes near opposite ends of an elongated blank, constructing templates, all of which have dowel pins receivable in the respective locating holes, applying the templates successively to the blank, performing cutting operations upon different areas of the blank guided by the templates successively applied thereto, and cutting away a terminal portion of the blank including at least one of said holes.

3. A method of contouring and providing cavities in an eyeglass temple for the reception of hearing aid components, which method comprises construction of a series of templates respectively having surfaces for guiding cutting tools for contouring the blank and for cutting cavities therein, providing the blank and the successive templates with mutual engageable complementary locating means, whereby each successive template will be accurately positioned respecting the blank while performing its guiding function, applying the templates successively to the blank, applying cutting tools to successive areas of the blank and guiding such tools by engaging guide surfaces of successive templates during the removal of blank material, the tool guided by at least one of said templates being operated to cut away portions of the blank between the side margins thereof to form a cavity therein, and at least one other tool being guided by its respective template and operated upon a side margin of the blank for the contouring thereof, both of the templates used in making the cavity and in contouring the blank being formed with locating means identically engaging the blank.

References Cited in the file of this patent

UNITED STATES PATENTS

| | | |
|---|---|---|
| 1,328,368 | Cotoli | Jan. 20, 1920 |
| 1,445,898 | Lutz | Feb. 20, 1923 |
| 1,680,327 | Eicher | Aug. 14, 1928 |
| 1,954,663 | Byrne | Apr. 10, 1934 |
| 2,003,846 | Wolff | June 4, 1935 |
| 2,152,507 | Trainor | Mar. 28, 1939 |
| 2,351,776 | Mirel | June 20, 1944 |
| 2,444,860 | Summer | July 6, 1948 |
| 2,523,354 | Butler | Sept. 26, 1950 |
| 2,630,755 | Herrin | Mar. 10, 1953 |
| 2,765,373 | Smith | Oct. 2, 1956 |
| 2,794,085 | De Angelis | May 28, 1957 |
| 2,894,076 | Posen | July 7, 1959 |
| 2,930,857 | Hollingsworth | Mar. 29, 1960 |

FOREIGN PATENTS

| | | |
|---|---|---|
| 491,677 | Great Britain | Sept. 7, 1938 |
| 644,352 | Great Britain | Oct. 11, 1950 |
| 723,981 | Great Britain | Feb. 16, 1955 |
| 737,115 | Great Britain | Sept. 21, 1955 |